United States Patent [19]
Campbell

[11] Patent Number: 5,858,247
[45] Date of Patent: Jan. 12, 1999

[54] SLUDGE DEMULSIFICATION PROCESS AND AGENTS

[75] Inventor: Gale James Campbell, Lafayette, La.

[73] Assignee: Texchem Group International, L.L.C., The Woodlands, Tex.

[21] Appl. No.: 733,528

[22] Filed: Oct. 18, 1996

[51] Int. Cl.⁶ .................................................. B01D 17/05
[52] U.S. Cl. ..................... 210/708; 134/22.19; 134/40; 208/428; 208/434; 208/188; 210/725; 210/728; 210/729; 210/732; 252/329; 252/332; 252/358
[58] Field of Search ............... 134/22.18, 22.19, 134/25.1, 40; 208/428, 434, 188; 210/708, 727, 728, 729, 732, 725; 252/329, 332, 358

[56] References Cited

U.S. PATENT DOCUMENTS

| | | | |
|---|---|---|---|
| 4,073,344 | 2/1978 | Hall | 166/307 |
| 4,129,508 | 12/1978 | Friihauf | 252/33 |
| 4,442,014 | 4/1984 | Looney et al. | 252/353 |
| 4,685,974 | 8/1987 | Furness et al. | 134/22.18 |
| 4,737,265 | 4/1988 | Merchant, Jr. et al. | 208/188 |
| 4,812,225 | 3/1989 | Corti et al. | 208/13 |
| 5,085,710 | 2/1992 | Goss | 134/22.14 |
| 5,306,351 | 4/1994 | Anderson | 134/40 |
| 5,356,482 | 10/1994 | Mehta et al. | 134/22.1 |
| 5,534,181 | 7/1996 | Henkel et al. | 510/423 |
| 5,611,869 | 3/1997 | Hart | 134/22.19 |
| 5,622,921 | 4/1997 | Dyer | 507/259 |

*Primary Examiner*—Peter A. Hruskoci
*Attorney, Agent, or Firm*—Roy, Kiesel & Tucker

[57] ABSTRACT

The invention involves the demulsification and liquefaction of hydrocarbon based sludges. A demulsifier and a liquefaction agent and methods of using the same are disclosed. In a preferred embodiment, the demulsifier contains a salt of DDBSA, polypropylene glycol, and citrene. In a preferred embodiment, the liquefaction agent contains a glycol ether and sodium silicate. In another preferred embodiment, the liquefaction agent contains a glycol ether and citrene. In preferred practice, the sludge is treated with the liquefaction agent, circulated, treated with the demulsifier, and circulated further. An object of the invention is to provide a hydrocarbon based sludge that is sufficiently liquefied to be pumped and which is sufficiently demulsified to allow the waters, oils, and solids in the sludge to separate.

208 Claims, No Drawings

SLUDGE DEMULSIFICATION PROCESS AND AGENTS

BACKGROUND OF THE INVENTION

1. Field of the Invention

The invention relates generally to liquefaction and demulsification agents for hydrocarbon based oil sludges and to their use to facilitate the demulsification and liquefaction of hydrocarbon based oil sludges and more particularly to their use to facilitate the demulsification and liquefaction of sludges in storage tanks.

2. Prior Art

Hydrocarbon based oils such as petroleum oils or vegetable oils are often stored in tanks. Over time, 'sludge' forms in the bottom of these tanks. Sludge is a mixture of deposits that collect at the bottom of the tanks. The sludge can be distinguished from oil in the tank primarily by a difference in viscosity. The minimum viscosity for a sludge varies within the industry from as low as 100 centipoise to as high as 500 centipoise.

The composition of the sludge varies from tank to tank and will depend upon the composition of the oil or oils that have been stored in a particular tank. The components of the sludge can generally be broken into three groups: water and water soluble materials (waters); oils and oil soluble materials (oils); and solids. The solids generally become wetted with either oils or waters. The sludge is formed when these components emulsify. (The more technically correct term for a solid/liquid colloid is "sol." However, for the sake of convenience, emulsion is used herein to refer to both liquid/liquid and to solid/liquid colloids)

Over time, the heavier elements in the oil such as paraffins, asphaltenes and solids migrate to the bottom of the tank and enter the sludge. As the concentration in the sludge of these heavier components increases, the sludge becomes more viscous and, depending upon the sludge components, may even solidify. The sludge becomes problematic when its viscosity prevents it from being pumped, and it begins to build up at the bottom of the tank. Eventually these sludges must be removed. If left unchecked, the sludge formation, will adversely impact the capacity of the tanks. However, removal of these sludges poses an expensive and sometimes dangerous problem for those in the tank farm industry.

In one removal method, these sludges are treated with aromatic compounds such as toluene to dissolve them. These chemicals have several shortcomings. First, the aromatic compounds are generally soluble in oil but not in water. This makes it difficult for the aromatics to effectively liquefy sludge which contain any substantial amount of water. Second, these chemicals are poor demulsifiers, so the liquefied sludge is still an emulsion. Introduction of demulsifiers into the sludges that have been liquefied aromatically has been found to lead to poor results. This is believed to result from the aromatic's inability to form a solution with the waters in the sludge. The failure to effectively place the waters into solution is believed to inhibit the ability of the demulsifiers to interact with the emulsified particles and thus to break the emulsion. Third, these chemicals often have health and safety problems associated with them. Many aromatic compounds are highly flammable and some are known carcinogens. This latter trait can substantially increase the disposal expenses of sludges that have been aromatically liquefied.

In another method, heat is applied to the sludge, usually with steam. This process also provides less than satisfactory results. Some sludges are not readily susceptible to liquefaction through heating. Once liquefied, the sludge must be pumped before it cools because cooling usually results in the reformation of a solid or semi-solid sludge. Cooling in the pump lines can lead to blockages which can be quite difficult to clear. Sludge that is removed using heat is often difficult to remove from the receiving vessel without reheating it. Heating the sludge can also cause some sludges to emit vapors which may create a fire hazard or a health hazard.

A third option is manual removal. This method is time consuming and expensive. The men that work in the tank are exposed to potential health risks connected with the chemicals in the tank as well as to possible injury in the fires or explosions that are a constant concern in the petroleum industry. Despite these drawbacks, manual removal is the only feasible removal mechanism for many sludges. Even when the previously discussed methods are employed, the sludge is often not rendered sufficiently fluid to be pumped out of the tank and at least some portion must be manually removed.

Removal of sludge manually is often very labor intensive, and can take as much as 180 days to clean a single tank. This results in lost revenue to the tank farm due to diminished storage capacity during this period. The labor requirements can often push the cost of cleaning a single tank over $(US) 500,000.00.

All of the previously discussed sludge removal methods share a common shortcoming: the loss of commercially valuable hydrocarbons contained in the sludge. The oils that are trapped in the sludge often have commercial value, but because of their emulsified state, it is not feasible to refine them. Consequently, these sludges must be discarded. This results in a double loss to the tank farm operator. First, he must throw away the unusable hydrocarbons trapped in the sludge. Second, the sludge is frequently treated as hazardous waste and can be expensive to dispose.

Accordingly, a demulsifier, a liquefaction agent, and method for using the same are desired to meet the following objectives.

OBJECTS OF THE INVENTION

It is an object of the invention to liquefy hydrocarbon sludge.

It is another object of the invention to demulsify hydrocarbon sludge.

It is another object of the invention to provide a refineable hydrocarbon stream from a liquefied demulsified hydrocarbon sludge.

It is another object of the invention to liquefy hydrocarbon sludge in a minimal amount of time.

It is another object of the invention to liquefy hydrocarbon sludge using a minimal amount of liquefaction agent.

It is another object of the invention to demulsify hydrocarbon sludge in a minimal amount of time.

It is another object of the invention to demulsify hydrocarbon sludge using a minimal amount of demulsifier.

It is another object of the invention to provide a liquefied hydrocarbon sludge which may be removed with a minimal amount of human interaction with the sludge or the liquefaction agent.

It is another object of the invention to provide a demulsified hydrocarbon sludge which may be removed with a minimal amount of human interaction with the sludge or the demulsifier.

It is another object of the invention to liquefy hydrocarbon sludge without using heat.

It is another object of the invention to provide a non-toxic agent for the liquefaction hydrocarbon sludge.

It is another object of the invention to provide a non-toxic agent for demulsifying hydrocarbon sludge.

SUMMARY OF THE INVENTION

There are demulsifiers known in the art which are capable of breaking the emulsions in hydrocarbon sludge. One such demulsifier is dodecyl benzyl sulfonic acid (DDBSA). A preferred embodiment of this demulsifier are its salts and most preferably its amine salts, all of which are water and oil soluble. The inventor purchases his DDBSA from Witco (address given below) and produces amine salts of DDBSA with amines made by Texaco Chemical Company, P.O. Box 27707, Houston, Tex. 77227, and sold under the trade name C-6 Amine. The invention comprises a liquefaction agent which facilitates the action of the demulsifier by liquefying the sludge and methods of using the same. As the sludge is rendered more fluid, the demulsifier is better able to attack the emulsified particles. As the emulsions are broken the phases separate and liquidity is restored. The result is a flowable end product that is separated into solids, waters, and oils. The oils and the waters may be pumped out separately, and if desired the oils may be refined. Only the solids need to be removed mechanically.

As noted, the invention works by increasing the liquidity of the sludge which allows the demulsifier to work more effectively. Breaking the emulsions also has a liquefying effect upon the sludge. In this way, the liquefaction agent and the demulsifier work together synergistically. This allows a flowable end product to be produced with a minimal amount of liquefaction agent and demulsifier.

The invention comprises the use of two primary liquefaction agents. The first are the glycol ethers $\{CH_2OH—CHOH—O—R\}$. These chemicals are an excellent choice for the liquefaction agent because they have the somewhat uncommon property of being soluble in water and in oil. Thus, they are able to form a solution with both the waters and the oils in the emulsion and to disperse the emulsified particles within the solution. Once the emulsified particles are dissolved, or at least partially dissolved, and dispersed the demulsifiers can more easily obtain access to the particles and break the emulsion. The particular glycol ether tested by the inventor was ethylene glycol butyl ether, $\{CH_2OH—CHOH—O—C_4H_9\}$.

Polymerized glycol ethers, $H\{—O—CHOH—CHOH—\}_nOH$, are another acceptable liquefaction agent. Like the monomers, they are soluble in water and in oil and can thus liquefy and disperse the emulsified particles. They have advantages over the monomer in that they are generally cheaper to manufacture and are generally less toxic than the monomers. The particular polymerized glycol ether which has been tested, poly (oxy-1, 2 ethanediyl), α butyl Ω hydroxy, $H\{—O—CH(C_4H_9)—CHOH—\}_nOH$, outperformed the monomer in liquefaction and dispersion. This polymer is a by-product produced in the manufacture of ethylene glycol butyl ether. It is frequently considered a waste product, although the inventor is aware of its use as a brake fluid. It is available from Occidental Chemical Corp. (OxyChem) Occidental Tower, P.O. Box 809050, Dallas, Tex. 75380 and from Dow Chemical Company, Midland, Mich. 48667 under the trade names Glycol Ether Residue and Glycol Ether Bottoms respectively.

The second primary liquefaction agents are the polyalkylene glycols, $H\{O(CH_2)_x\}_nOH$. They also are soluble in oil and in water and are thus effective liquefaction and dispersion agents. Polyalkylene glycols having molecular weights of between about 250 and about 2500 are expected to provide the best result. Polyalkylene glycols with a molecular weight below about 250 are generally expected to be insufficiently oil soluble to perform adequately. They are also generally more toxic than the higher molecular weight polymers. Polyalkylene glycols with a molecular weight above about 2500 are generally expected to be too viscous to effectively enter into solution with the sludge.

A particular polyalkylene glycol which has been shown to perform adequately is polypropylene glycol. $H\{OCH_2CH_2CH_2\}_nOH$. Although other polyalkylenes glycols would be acceptable liquefaction agents, the residuals of some—such as polyethylene glycol and polybutylene glycol—are hazardous. Polypropylene glycols are preferred because their residuals are not hazardous. Off-specification products will generally be used where possible because of their cost advantages over the specification grade products. Use of the polypropylene glycols will facilitate the use of the cheaper off-specification products. A slightly off-specification quality polypropylene was used during testing. It had an average molecular weight of between 950 and 1,200. As will be illustrated in the discussion of the experiments below, it performed quite well and should provide an economical commercial substitute for specification quality polypropylene.

These liquefaction agents and demulsifiers may be used in combination with other agents to optimize the results obtained. Some of these other agents are discussed below.

A high paraffin and/or asphaltene content will make the sludge very viscous. If enough paraffins and/or asphaltenes are present, the sludge may actually solidify and can become quite hard. In such sludges, it is generally desirable and may be necessary to soften the sludge so that the demulsifiers and the liquefaction agents can enter the sludge. To soften the sludge, it should be treated with a plasticizer, such as terpene. Terpenes, $\{C_{10}H_{16}\}$, are oil soluble, water insoluble compounds which are distilled from plants. Of principal relevance to the present invention is their ability to dissolve paraffins. By dissolving, or partially dissolving, the paraffins, the terpenes can soften the sludge sufficiently to allow the demulsifiers and the liquefaction agents to enter.

Many terpenes are toxic; however, citrene, a terpene extracted from citrus rinds, is not toxic and is a good plasticizing agent. Citrene is, therefore, preferred over the other terpenes as a plasticizer. In addition to their toxicity, most terpenes are also flammable. Citrene, for example, has a flash point of 120° F. The terpenes may be used more safely by mixing them with a liquefaction agent. For example, a 1:1 mixture by volume of citrene and poly (oxy-1, 2 ethanediyl), α butyl Ω hydroxy has a flash point of 180° to 200° F. While this is no longer considered flammable, it is still considered combustible and it should be handled accordingly.

Another agent which may be used in combination with the demulsifiers and liquefaction agents is sodium silicate which may be used to facilitate the separation of solids from the sludge. The sodium silicate helps to break the adhesion between the oils and the solids and forms a coating on the solid particles. The coating prevents the oils from readhering to the solids and encourages gravity separation of the solids from the sludge.

Another agent which may be added to the demulsifiers and liquefaction agents is a blend of resin esters and glycol esters. This agent is added primarily to effect the separation of the finer solid particles from the sludge. Additionally, it is useful in completing the separation of the waters from the emulsion. This agent may be thought of as a "polishing" agent in that its function is primarily to remove the last of the solids and the waters from the almost fully separated emulsion. Its composition beyond that listed above is unknown. It is an oil soluble but water insoluble product sold by Witco Corp. of 3200 Brookfield (Almaeda Rd.), Houston, Tex., under their trade names DRE8164 and DRG162.

In some applications it may be desirable to add an acid to the sludge. First, the inventor has noticed a mild increase in the effectiveness of the liquefaction agents and demulsifiers when their pH is acidic. Second, the addition of the acid can have positive effects on the cost of disposing the waters separated from the sludge. Many of the agents discussed above have a pH which is quite basic. As a result, the waters produced in the demulsification process will be basic as well. Their basicity can increase the cost of disposal because of the environmental problems associated with high pH waste water. Addition of an appropriate amount of acid can lower pH to acceptable levels. The inventor contemplates using citric acid as the acid additive because it is non-toxic. However, for purposes of lowering pH, other acids are acceptable.

Use of the acid agent will usually be undesirable in petroleum sludges because most petroleum sludges contain iron sulfides. The acids will react with the iron sulfides to produce hydrogen sulfide, a highly poisonous gas. This will not be a problem when the invention is used to separate sludges that do not contain sulfides, such as vegetable oil sludges.

In operation, the liquefaction agent or agents and the demulsifier will be added to the sludge. The other agents discussed above may be added as well. The sludge and added components will be mixed together and recirculated for several hours. The agents will act upon the sludge, causing it to liquefy and to demulsify. Upon completion of the process, the sludge will separate into an oil layer, a water layer and a solid layer. The liquids may be removed and easily separated. It is anticipated that the oils extracted from the sludge will be refineable in most cases. The waters will usually be treated and discarded. The solids will require mechanical removal from the tank and will also usually be discarded. The preferred mode of effecting these steps is discussed in more detail in the following sections.

DESCRIPTION OF THE BEST MODE

The inventor contemplates using the invention in five different formulations. These are referred to for convenience as C105 BC, C105 AC, C105 SA, C105 EB, and C105 EBS. The composition for each of these is given below. All percentages are by volume and are intended to be approximations only and not limiting in any sense.

| C105BC | |
|---|---|
| NaSi | 5% |
| glycol ether [preferably poly (oxy-1,2 ethanediyl), α butyl Ω hydroxy] | 5% |
| water | 90% |
| C105 AC | |
| add citric acid [solid concentrate pH <1] to C105BC | 1% |

| -continued | |
|---|---|
| C105 SA | |
| glycol ether [preferably poly (oxy-1,2 ethanediyl), α butyl Ω hydroxy] | 50% |
| terpene [preferably citrene] | 50% |
| C105 EB | |
| amine salt of DDBSA | 60% |
| polyalkylene glycol [preferably polypropylene glycol M.W. ≈950 to ≈1200] | 15% |
| blend of resin esters and glycol esters [preferably DRE8164 (10%) and DRG162 (2.5%) Witco, Corp.] | 12.5% |
| terpene [preferably citrene] | 12.5% |
| C105 EBS | |
| C105 EB | 10 to 40% |
| C105 SA | 90 to 60% |

In practice, either the C105 AC or the C105 BC will usually be applied first, followed by the C105 EB. If the paraffin content is high, the C105 SA or C105 EBS should be used first, again followed by the C105 EB. To facilitate the selection of which formulations of the invention should be used, the operator should first obtain a sample of the sludge. Paraffin content could be measured directly from the sample; however, it will usually be more convenient to measure viscosity as the viscosity will largely be a function of the paraffin content and of the molecular weight of the particular paraffins.

For sludges with a viscosity of less than about 1500 centipoise, the C105 BC or C105 AC will usually be an acceptable liquefaction agent. Sludges with a viscosity of between about 1500 and about 5000 centipoise will usually respond better to treatment with some C105 SA or C105 EBS liquefaction agent. However, it should be noted that in the examples discussed below, a sludge having a viscosity of approximately 4000 centipoise was effectively treated using only C105 BC and C 105 EB. Sludges with a viscosity above about 5000 centipoise will usually require initial treatment with a C105 SA liquefaction agent. In all cases, treatment with a C105 EB demulsifier will follow the initial treatment. The only exception being the case where the C105 EBS has a sufficiently high C105 EB content that addition of further C105 EB is not necessary.

When the C105 BC or C105 AC liquefaction agents are used, the inventor expects an addition of a volume of the liquefaction agent equal to about one (1) percent to about ten (10, percent of the total sludge volume to be sufficient, and expects a volume of about six (6) percent to be appropriate in most cases. When the C105 SA liquefaction agent is used, the inventor expects an addition of a volume of the liquefaction agent equal to about two and one half (2.5) percent to about thirty (30) percent of the total sludge volume to be sufficient, and expects a volume of about five (5) percent to about ten (10) percent to be appropriate in most cases. When the C105 EBS liquefaction agent is used, the inventor expects an addition of a volume of the liquefaction agent equal to about one half of one (0.5) percent to about ten (10) percent of the total volume of the sludge to be sufficient, and expects a volume of about two and one half (2.5) percent to about five (5) percent to be appropriate in most cases. When the C105 EB demulsifier is used, the inventor expects an addition of a volume of the demulsifier equal to about one half of one (0.5) percent to about one and one half (1.5) percent of the total volume of the sludge to be sufficient, and expects a volume of about one half of one (0.5) percent to be appropriate in most cases.

In many cases where the C105 SA or C105 EBS is used, the amount needed may be reduced by using either liquefaction agent in combination with the C105 BC liquefaction agent. This is especially beneficial from a cost perspective. Of the different formulations, C105 BC and C105 AC are the least expensive. The C105 SA is considerably more expensive. The C105 EBS and the C105 EB are more expensive still. Use of the C105 BC to reduce the amount of C105 SA or C105 EBS needed can reduce the overall cost of treatment.

It must be emphasized that each sludge is different. The variety of sludge compositions requires that some trial and error lab work be performed on small sludge samples to determine the exact combination of formulations that would be best to liquefy and demulsify any particular sludge.

In some applications, it may be desirable to minimize the amount of demulsifiers or liquefaction agents that enter the waters in the sludge. It is often necessary to treat these waters before they are disposed, and the removal of any additional chemicals contained in the water will increase the cost of that treatment. However, several of the chemicals used as liquefaction agents or as demulsifiers are soluble in oil and water. When these agents are added to the sludge, some of them will ultimately end up in the waters. The amount in the waters can be minimized by placing the agents in solution with water insoluble chemicals prior to their introduction into the sludge. The water insoluble chemicals are believed to buffer the ability of the water soluble chemicals to go into solution with the waters. For example, this will result in the water stream removed from a sludge treated with C105 SA or C105 EBS containing fewer glycol ethers than the water stream from a similar sludge treated with C105 BC. Although it will increase the cost of treatment, it may be desirable in some instances to treat even sludges with viscosities of less than 1500 centipoise with liquefaction agents that consist of only C105 SA or C105 EBS.

When used to treat sludge in storage tanks, the different formulations of the invention may be introduced through the tank's loading and drainage pipes. In a preferred mode of operation, pumps are added so that the formulations may be added under pressure. Delivering the demulsifiers and liquefaction agents under pressure allows them to physically penetrate more deeply within the sludge which in turn allows the sludge to be treated more rapidly. Pressures of 40 to 120 p.s.i. have been found to be effective.

In operation, the formulations are added to the sludge under pressure through the tank's loading pipes. The excess fluid is then pumped out of the tank's drainage pipes, recirculated by the pump back into the loading pipes, and reintroduced into the tank under pressure. As the process is repeated and the sludge becomes more fluid, the liquefied sludge will join the excess fluid and will be recirculated itself. This leads to a thorough mixture of the demulsifiers and liquefaction agents with the sludge which in turn leads to a thorough treatment of the entire sludge.

The most preferred mode of administering the formulations of the invention contemplated by the inventor would entail injecting the formulations into the sludge under pressure through a plurality of extensible nozzles extending down from the top of the tank. This would allow the formulations to be introduced into the sludge evenly and should lead to quicker demulsification and liquefaction with the introduction of less of the respective agents. As in the previous mode of administering the formulations of the invention, the excess fluid would be pumped out through the drainage pipes, recirculated by the pumps and reintroduced to the tank via the nozzles. The inventor anticipates that a pressure of 150 to 500 p.s.i would be preferable in this mode of operation.

EXAMPLES

In the following examples, the glycol ether in the C105 BC was in the form of Glycol Ether Residue obtained from Oxychem which was over 90% poly (oxy-1, 2 ethanediyl), $\alpha$ butyl $\Omega$ hydroxy, and the polyalkylene glycols were in the form of an off specification polypropylene glycol having an average molecular weight of between about 950 and about 1200

Example 1

The invention was used to treat a crude oil storage tank having a total volume of approximately 200,000 bbl and containing approximately 25,000 bbl of sludge. A sample was taken revealing that the sludge contained about 56.7% by weight oils and about 43.3% by weight waters. Contained within the waters were about 7.5% by volume solids. The sludge had a viscosity of about 4000 centipoise.

Approximately 1500 bbl of C 105 BC (~6% of the sludge volume) were added to the tank over six hours. Recirculation at approximately 8000 bbl per hour was conducted while the C 105 BC was being introduced. Approximately 125 to 160 bbl of C 105 EB (~5000 ppm) were then added. Recirculation was continued for forty-eight hours at approximately 8000 bbl per hour. At the end of the forty-eight hours, the sludge was liquefied and demulsified. An oil layer and a water layer having a combined volume of approximately 24,500 bbl was pumped off. A solid layer comprising primarily sand and anhydrite remained. The solid layer had a volume of approximately 500 bbl. Waters were of course contained within the solid layer. These waters were siphoned out and the solids were mechanically removed.

The liquids extracted from this tank were disposable as oil field waste under the EPA's solid waste disposal regulations. No waste was classified as hazardous waste. The total volume of the demulsifiers and liquefaction agents used to treat the sludge was less than 1700 bbl. This amounted to less than 7% of the total volume of sludge treated. Finally, the total down time for the tank was only 6 days.

Example 2

The invention was used to treat a crude oil storage tank having a total volume of approximately 200,000 bbl and containing approximately 31,000 bbl of sludge. The sample data taken from the sludge in example one was used in treating the sludge in this example.

Approximately 1900 bbl (~6% of the sludge volume) of C105 BC were added to the tank over eight hours. Recirculation at approximately 8000 bbl per hour was conducted during the introduction of the C105 BC. When all of the C105 BC had been added approximately 155 to 165 bbl (~5000 ppm) of C105 EB were added to the tank. Recirculation was continued for forty-eight hours at approximately 8000 bbl per hour. At the end of the forty-eight hours, the sludge was liquefied and demulsified. An oil layer and a water layer having a combined volume of approximately 30,850 bbl were pumped off. A solid layer comprising primarily sand and anhydrite remained. The solid layer had a volume of approximately 150 bbl. Waters were of course contained within the solid layer. These waters were siphoned out and the solids were mechanically removed.

The liquids extracted from this tank were disposable as oil field waste under the EPA solid waste disposal regulations. No waste was classified as hazardous waste. The total volume of demulsifiers and liquefaction agents used to treat the sludge was less than 2,100 bbl. This amounted to less than 7% of the total volume of sludge treated. Finally, the total down time for the tank was only five days.

Example 3

The invention was used to treat a crude oil storage tank having a total volume of approximately 200,000 bbl and containing approximately 7,500 bbl of sludge. The sample data taken from the sludge in example one was used in treating the sludge in this example.

Approximately 450 bbl (~6% of the sludge volume) of C105 BC were added to the tank over three hours. Recirculation at approximately 8000 bbl per hour was conducted during the introduction of the C105 BC. When all of the C105 BC had been added, approximately 35–40 bbl (~5000 ppm) of C105 EB were added to the tank. Recirculation was continued for forty-eight hours at 8000 bbl per hour. At the end of the forty-eight hours, the sludge was liquefied and demulsified.

This former sludge and the C105 BC and C105 EB it contained were pumped into a second tank having a total volume of approximately 200,000 bbl and containing approximately 2,500 bbl of sludge. No additional chemicals were added.

The contents of the second tank were circulated for forty-eight hours. At the end of the forty-eight hours, the sludge was liquefied and demulsified. An oil layer and a water layer having a combined volume of approximately 9,800 bbl were pumped off. A solid layer comprising primarily sand and anhydrite remained. The solid layer from both tanks had a volume of less than 200 bbl. Waters were of course contained within the solid layer. These waters were siphoned out and the solids were mechanically removed. The liquids extracted from this tank were disposable as oil field waste under the EPA solid waste disposal regulations. No waste was classified as hazardous waste.

In the foregoing examples, the oils and waters were both disposed of, so their individual volumes were not measured; however, an observable separation was noted in all three tanks. Also, a sample was taken of the liquefied and demulsified oil layer in one tank, and it was found to have an API (American Petroleum Institute) gravity of 34.6. This relatively high API gravity is indicative of a low water content in the oil layer. In light of this API gravity, the liquids extracted could have easily been separated and sent to a refinery for processing.

Separate samples were not taken from the sludge in each tank. Nor were post liquefaction and demulsification samples taken of the oil layers in each tank. Ordinarily, this would have been done; however, separate samples were not needed from each because the tanks in question were all exclusively used to store oil from the same field. Thus, the sludges were all expected to be of substantially the same constitution as were the products produced when those sludges were liquefied and demulsified.

Other uses and embodiments of the invention, equivalent to that disclosed herein, will occur to those skilled in the art, and are intended to be included within the scope and spirit of the following claims.

I claim:

1. A method of demulsifying hydrocarbon based sludge in a tank comprising:

treating said sludge with a demulsifier comprised of polyalkylene glycols and dodecyl benzyl sulfonic acid (DDBSA), wherein said demulsifier is provided in a volume of at least about 0.5 percent the volume of said sludge, wherein said DDBSA comprises at least about 0.3 percent by volume of said sludge, and wherein said polyalkylene glycols comprise at least about 0.075 percent by volume of said sludge; and circulating said demulsifier and said sludge.

2. A method of demulsifying hydrocarbon based sludge according to claim 1 wherein said demulsifier is provided in a volume of at least about 1.5 percent the volume of said sludge.

3. A method of demulsifying hydrocarbon based sludge according to claim 1 wherein said DDBSA is provided in the form of a salt of DDBSA.

4. A method of demulsifying hydrocarbon based sludge according to claim 3 wherein said demulsifier is provided in a volume of at least about 1.5 percent the volume of said sludge.

5. A method of demulsifying hydrocarbon based sludge according to claim 1 wherein said DDBSA is provided in the form of an amine salt of DDBSA.

6. A method of demulsifying hydrocarbon based sludge according to claim 5 wherein said demulsifier is provided in a volume of at least about 1.5 percent the volume of said sludge.

7. A method of demulsifying hydrocarbon based sludge according to claim 1 wherein said polyalkylene glycols comprise at least about 0.075 percent by volume of said sludge.

8. A method of demulsifying hydrocarbon based sludge according to claim 7 wherein said demulsifier is provided in a volume of at least about 1.5 percent the volume of said sludge.

9. A method of demulsifying hydrocarbon based sludge according to claim 1 wherein said polyalkylene glycols have an average molecular weight of between about 950 and about 1,200.

10. A method of demulsifying hydrocarbon based sludge according to claim 9 wherein said polyalkylene glycols comprise at least about 0.075 percent by volume of said sludge.

11. A method of demulsifying hydrocarbon based sludge according to claim 10 wherein said demulsifier is provided in a volume of at least about 1.5 percent the volume of said sludge.

12. A method of demulsifying hydrocarbon based sludge according to claim 1 wherein said demulsifier is further comprised of a terpene.

13. A method of demulsifying hydrocarbon based sludge according to claim 12 wherein said terpene comprises at least about 0.0625 percent by volume of said sludge.

14. A method of demulsifying hydrocarbon based sludge according to claim 13 wherein said demulsifier is provided in a volume of at least about 1.5 percent the volume of said sludge.

15. A method of demulsifying hydrocarbon based sludge according to claim 1 wherein said demulsifier is further comprised of citrene.

16. A method of demulsifying hydrocarbon based sludge according to claim 15 wherein said citrene comprises at least about 0.0625 percent by volume of said demulsifier.

17. A method of demulsifying hydrocarbon based sludge according to claim 16 wherein said demulsifier is provided in a volume of at least about 1.5 percent the volume of said sludge.

18. A method of demulsifying hydrocarbon based sludge comprising:
   treating said sludge with a demulsifier comprised of polyalkylene glycols and dodecyl benzyl sulfonic acid (DDBSA), wherein said demulsifier is provided in a volume of at least about 0.5 percent the volume of said sludge, wherein said DDBSA comprises at least about 0.3 percent by volume of said sludge, and wherein said polyalkylene glycols comprise at least about 0.075 percent by volume of said sludge;
   circulating said demulsifier and said sludge; and
   allowing said sludge to separate into a solid, a water, and an oil component.

19. A method of demulsifying hydrocarbon based sludge according to claim 18 wherein said demulsifier is provided in a volume of at least about 1.5 percent the volume of said sludge.

20. A method of demulsifying hydrocarbon based sludge according to claim 18 wherein said DDBSA is provided in the form of a salt of DDBSA.

21. A method of demulsifying hydrocarbon based sludge according to claim 20 wherein said demulsifier is provided in a volume of at least about 1.5 percent the volume of said sludge.

22. A method of demulsifying hydrocarbon based sludge according to claim 18 wherein said DDBSA is provided in the form of an amine salt of DDBSA.

23. A method of demulsifying hydrocarbon based sludge according to claim 22 wherein said demulsifier is provided in a volume of at least about 1.5 percent the volume of said sludge.

24. A method of demulsifying hydrocarbon based sludge according to claim 18 wherein said polyalkylene glycols comprise at least about 0.075 percent by volume of said sludge.

25. A method of demulsifying hydrocarbon based sludge according to claim 24 wherein said demulsifier is provided in a volume of at least about 1.5 percent the volume of said sludge.

26. A method of demulsifying hydrocarbon based sludge according to claim 18 wherein said polyalkylene glycols have an average molecular weight of between about 950 and about 1,200.

27. A method of demulsifying hydrocarbon based sludge according to claim 26 wherein said polyalkylene glycols comprise at least about 0.075 percent by volume of said sludge.

28. A method of demulsifying hydrocarbon based sludge according to claim 27 wherein said demulsifier is provided in a volume of at least about 1.5 percent the volume of said sludge.

29. A method of demulsifying hydrocarbon based sludge according to claim 18 wherein said demulsifier is further comprised of a terpene.

30. A method of demulsifying hydrocarbon based sludge according to claim 29 wherein said terpene comprises at least about 0.0625 percent by volume of said sludge.

31. A method of demulsifying hydrocarbon based sludge according to claim 30 wherein said demulsifier is provided in a volume of at least about 1.5 percent the volume of said sludge.

32. A method of demulsifying hydrocarbon based sludge according to claim 18 wherein said demulsifier is further comprised of citrene.

33. A method of demulsifying hydrocarbon based sludge according to claim 32 wherein said citrene comprises at least about 0.0625 percent by volume of said demulsifier.

34. A method of demulsifying hydrocarbon based sludge according to claim 33 wherein said demulsifier is provided in a volume of at least about 1.5 percent the volume of said sludge.

35. A method of demulsifying hydrocarbon based sludge in a tank comprising:
   treating said sludge with a demulsifier comprised of polypropylene glycols and dodecyl benzyl sulfonic acid (DDBSA), wherein said demulsifier is provided in a volume of at least about 0.5 percent the volume of said sludge, wherein said DDBSA comprises at least about 0.3 percent by volume of said sludge, and wherein said polypropylene glycols comprise at least about 0.075 percent by volume of said sludge; and
   circulating said demulsifier and said sludge.

36. A method of demulsifying hydrocarbon based sludge according to claim 35 wherein said demulsifier is provided in a volume of at least about 1.5 percent the volume of said sludge.

37. A method of demulsifying hydrocarbon based sludge according to claim 35 wherein said DDBSA is provided in the form of a salt of DDBSA.

38. A method of demulsifying hydrocarbon based sludge according to claim 37 wherein said demulsifier is provided in a volume of at least about 1.5 percent the volume of said sludge.

39. A method of demulsifying hydrocarbon based sludge according to claim 35 wherein said DDBSA is provided in the form of an amine salt of DDBSA.

40. A method of demulsifying hydrocarbon based sludge according to claim 39 wherein said demulsifier is provided in a volume of at least about 1.5 percent the volume of said sludge.

41. A method of demulsifying hydrocarbon based sludge according to claim 35 wherein said polyalkylene glycols have an average molecular weight of between about 950 and about 1,200.

42. A method of demulsifying hydrocarbon based sludge according to claim 41 wherein said demulsifier is provided in a volume of at least about 1.5 percent the volume of said sludge.

43. A method of demulsifying hydrocarbon based sludge according to claim 35 wherein said demulsifier is further comprised of a terpene.

44. A method of demulsifying hydrocarbon based sludge according to claim 43 wherein said terpene comprises at least about 0.0625 percent by volume of said demulsifier.

45. A method of demulsifying hydrocarbon based sludge according to claim 44 wherein said demulsifier is provided in a volume of at least about 1.5 percent the volume of said sludge.

46. A method of demulsifying hydrocarbon based sludge according to claim 44 wherein said demulsifier is further comprised of citrene.

47. A method of demulsifying hydrocarbon based sludge according to claim 46 wherein said citrene comprises at least about 0.0625 percent by volume of said demulsifier.

48. A method of demulsifying hydrocarbon based sludge according to claim 47 wherein said demulsifier is provided in a volume of at least about 1.5 percent the volume of said sludge.

49. A method of demulsifying hydrocarbon based sludge comprising:
   treating said sludge with a demulsifier comprised of polypropylene glycols and dodecyl benzyl sulfonic acid (DDBSA), wherein said demulsifier is provided in a volume of at least about 0.5 percent the volume of said sludge, wherein said DDBSA comprises at least about 0.3 percent by volume of said sludge, and wherein said polypropylene glycols comprise at least about 0.075 percent by volume of said sludge;

circulating said demulsifier and said sludge; and allowing said sludge to separate into a solid, a water, and an oil component.

50. A method of demulsifying hydrocarbon based sludge according to claim 49 wherein said demulsifier is provided in a volume of at least about 1.5 percent the volume of said sludge.

51. A method of demulsifying hydrocarbon based sludge according to claim 49 wherein said DDBSA is provided in the form of a salt of DDBSA.

52. A method of demulsifying hydrocarbon based sludge according to claim 51 wherein said demulsifier is provided in a volume of at least about 1.5 percent the volume of said sludge.

53. A method of demulsifying hydrocarbon based sludge according to claim 49 wherein said DDBSA is provided in the form of an amine salt of DDBSA.

54. A method of demulsifying hydrocarbon based sludge according to claim 53 wherein said demulsifier is provided in a volume of at least about 1.5 percent the volume of said sludge.

55. A method of demulsifying hydrocarbon based sludge according to claim 49 wherein said polyalkylene glycols have an average molecular weight of between about 950 and about 1,200.

56. A method of demulsifying hydrocarbon based sludge according to claim 55 wherein said demulsifier is provided in a volume of at least about 1.5 percent the volume of said sludge.

57. A method of demulsifying hydrocarbon based sludge according to claim 49 wherein said demulsifier is further comprised of a terpene.

58. A method of demulsifying hydrocarbon based sludge according to claim 57 wherein said terpene comprises at least about 0.0625 percent by volume of said demulsifier.

59. A method of demulsifying hydrocarbon based sludge according to claim 58 wherein said demulsifier is provided in a volume of at least about 1.5 percent the volume of said sludge.

60. A method of demulsifying hydrocarbon based sludge according to claim 49 wherein said demulsifier is further comprised of citrene.

61. A method of demulsifying hydrocarbon based sludge according to claim 60 wherein said citrene comprises at least about 0.0625 percent by volume of said demulsifier.

62. A method of demulsifying hydrocarbon based sludge according to claim 61 wherein said demulsifier is provided in a volume of at least about 1.5 percent the volume of said sludge.

63. A method of liquefying and demulsifying a hydrocarbon based sludge in a tank comprising:

treating said sludge with a liquefaction agent comprising glycol ethers, wherein said liquefaction agent is provided in a volume of at least about 0.5 percent the volume of said sludge;

treating said sludge with a demulsifier comprising dodecyl benzyl sulfonic acid (DDBSA), wherein said demulsifier is provided in a volume of at least about 0.5 percent the volume of said sludge; and circulating said sludge.

64. A method of liquefying and demulsifying a hydrocarbon based sludge according to claim 63 wherein said glycol ethers comprise at least about 0.025 percent the volume of said sludge.

65. A method of liquefying and demulsifying a hydrocarbon based sludge according to claim 64 wherein said liquefaction agent is provided in a volume of at least about 5.0 percent the volume of said sludge.

66. A method of liquefying and demulsifying a hydrocarbon based sludge according to claim 64 wherein said liquefaction agent is provided in a volume of at least about 10.0 percent the volume of said sludge.

67. A method of liquefying and demulsifying a hydrocarbon based sludge according to claim 63 wherein said glycol ethers comprise at least about 0.25 percent the volume of said sludge.

68. A method of liquefying and demulsifying a hydrocarbon based sludge according to claim 67 wherein said liquefaction agent is provided in a volume of at least about 5.0 percent the volume of said sludge.

69. A method of liquefying and demulsifying a hydrocarbon based sludge according to claim 67 wherein said liquefaction agent is provided in a volume of at least about 10.0 percent the volume of said sludge.

70. A method of liquefying and demulsifying a hydrocarbon based sludge according to claim 63 wherein said glycol ethers comprise ethylene glycol butyl ether.

71. A method of liquefying and demulsifying a hydrocarbon based sludge according to claim 70 wherein said ethylene glycol butyl ether comprises at least about 0.025 percent the volume of said sludge.

72. A method of liquefying and demulsifying a hydrocarbon based sludge according to claim 71 wherein said liquefaction agent is provided in a volume of at least about 5.0 percent the volume of said sludge.

73. A method of liquefying and demulsifying a hydrocarbon based sludge according to claim 71 wherein said liquefaction agent is provided in a volume of at least about 10.0 percent the volume of said sludge.

74. A method of liquefying and demulsifying a hydrocarbon based sludge according to claim 70 wherein said ethylene glycol butyl ether comprises at least about 0.25 percent the volume of said sludge.

75. A method of liquefying and demulsifying a hydrocarbon based sludge according to claim 74 wherein said liquefaction agent is provided in a volume of at least about 5.0 percent the volume of said sludge.

76. A method of liquefying and demulsifying a hydrocarbon based sludge according to claim 74 wherein said liquefaction agent is provided in a volume of at least about 10.0 percent the volume of said sludge.

77. A method of liquefying and demulsifying a hydrocarbon based sludge according to claim 63 wherein said glycol ethers comprise polymerized glycol ethers.

78. A method of liquefying and demulsifying a hydrocarbon based sludge according to claim 77 wherein said polymerized glycol ethers comprise at least about 0.025 percent by volume of said liquefaction agent.

79. A method of liquefying and demulsifying a hydrocarbon based sludge according to claim 78 wherein said liquefaction agent is provided in a volume of at least about 5.0 percent the volume of said sludge.

80. A method of liquefying and demulsifying a hydrocarbon based sludge according to claim 78 wherein said liquefaction agent is provided in a volume of at least about 10.0 percent the volume of said sludge.

81. A method of liquefying and demulsifying a hydrocarbon based sludge according to claim 77 wherein said polymerized glycol ethers comprise at least about 0.25 percent the volume of said sludge.

82. A method of liquefying and demulsifying a hydrocarbon based sludge according to claim 81 wherein said liquefaction agent is provided in a volume of at least about 5.0 percent the volume of said sludge.

83. A method of liquefying and demulsifying a hydrocarbon based sludge according to claim 81 wherein said liquefaction agent is provided in a volume of at least about 10.0 percent the volume of said sludge.

84. A method of liquefying and demulsifying a hydrocarbon based sludge according to claim 63 wherein said glycol ethers comprise poly (oxy-1, 2 ethanediyl) α butyl Ω hydroxy.

85. A method of liquefying and demulsifying a hydrocarbon based sludge according to claim 84 wherein said poly (oxy-1, 2 ethanediyl) α butyl Ω hydroxy comprises at least about 0.025 percent the volume of said sludge.

86. A method of liquefying and demulsifying a hydrocarbon based sludge according to claim 85 wherein said liquefaction agent is provided in a volume of at least about 5.0 percent the volume of said sludge.

87. A method of liquefying and demulsifying a hydrocarbon based sludge according to claim 85 wherein said liquefaction agent is provided in a volume of at least about 10.0 percent the volume of said sludge.

88. A method of liquefying and demulsifying a hydrocarbon based sludge according to claim 84 wherein said poly (oxy-1, 2 ethanediyl) α butyl Ω hydroxy comprises at least about 0.25 percent the volume of said sludge.

89. A method of liquefying and demulsifying a hydrocarbon based sludge according to claim 88 wherein said liquefaction agent is provided in a volume of at least about 5.0 percent the volume of said sludge.

90. A method of liquefying and demulsifying a hydrocarbon based sludge according to claim 88 wherein said liquefaction agent is provided in a volume of at least about 10.0 percent the volume of said sludge.

91. A method of liquefying and demulsifying a hydrocarbon based sludge according to claim 63 wherein said liquefaction agent is comprised of sodium silicate.

92. A method of liquefying and demulsifying a hydrocarbon based sludge according to claim 91 wherein said sodium silicate comprises at least about 0.025 percent the volume of said sludge.

93. A method of liquefying and demulsifying a hydrocarbon based sludge according to claim 92 wherein said liquefaction agent is provided in a volume of at least about 5.0 percent the volume of said sludge.

94. A method of liquefying and demulsifying a hydrocarbon based sludge according to claim 92 wherein said liquefaction agent is provided in a volume of at least about 10.0 percent the volume of said sludge.

95. A method of liquefying and demulsifying a hydrocarbon based sludge according to claim 63 wherein said liquefaction agent is comprised of a terpene.

96. A method of liquefying and demulsifying a hydrocarbon based sludge according to claim 95 wherein said terpene comprises at least about 0.25 percent the volume of said sludge.

97. A method of liquefying and demulsifying a hydrocarbon based sludge according to claim 96 wherein said liquefaction agent is provided in a volume of at least about 5.0 percent the volume of said sludge.

98. A method of liquefying and demulsifying a hydrocarbon based sludge according to claim 96 wherein said liquefaction agent is provided in a volume of at least about 10.0 percent the volume of said sludge.

99. A method of liquefying and demulsifying a hydrocarbon based sludge according to claim 63 wherein said liquefaction is comprised of citrene.

100. A method of liquefying and demulsifying a hydrocarbon based sludge according to claim 99 wherein said citrene comprises at least about 0.25 percent the volume of said sludge.

101. A method of liquefying and demulsifying a hydrocarbon based sludge according to claim 100 wherein said liquefaction agent is provided in a volume of at least about 5.0 percent the volume of said sludge.

102. A method of liquefying and demulsifying a hydrocarbon based sludge according to claim 100 wherein said liquefaction agent is provided in a volume of at least about 10.0 percent the volume of said sludge.

103. A method of liquefying and demulsifying a hydrocarbon based sludge according to claim 63 wherein said liquefaction agent is comprised of an acid of sufficient strength to reduce the pH of said liquefaction agent to between about 5 and about 6.

104. A method of liquefying and demulsifying a hydrocarbon based sludge according to claim 103 wherein said acid is comprised of citric acid.

105. A method of liquefying and demulsifying a hydrocarbon based sludge according to claim 104 wherein said liquefaction agent is provided in a volume of at least about 5.0 percent the volume of said sludge.

106. A method of liquefying and demulsifying a hydrocarbon based sludge according to claim 104 wherein said liquefaction agent is provided in a volume of at least about 10.0 percent the volume of said sludge.

107. A method of liquefying and demulsifying a hydrocarbon based sludge according to claim 63 wherein said liquefaction agent is provided in a volume of at least about 5.0 percent the volume of said sludge.

108. A method of liquefying and demulsifying a hydrocarbon based sludge according to claim 63 wherein said liquefaction agent is provided in a volume of at least about 10.0 percent the volume of said sludge.

109. A method of liquefying and demulsifying a hydrocarbon based sludge according to claim 63 wherein said DDBSA comprises at least about 0.3 percent the volume of said sludge.

110. A method of demulsifying hydrocarbon based sludge according to claim 109 wherein said demulsifier is provided in a volume of at least about 1.5 percent the volume of said sludge.

111. A method of liquefying and demulsifying a hydrocarbon based sludge according to claim 63 wherein said DDBSA is provided in the form of a salt of DDBSA.

112. A method of liquefying and demulsifying a hydrocarbon based sludge according to claim 111 wherein said DDBSA salt comprises at least about 0.3 percent the volume of said sludge.

113. A method of demulsifying hydrocarbon based sludge according to claim 112 wherein said demulsifier is provided in a volume of at least about 1.5 percent the volume of said sludge.

114. A method of liquefying and demulsifying a hydrocarbon based sludge according to claim 63 wherein said demulsifier is comprised of an amine salt of DDBSA.

115. A method of liquefying and demulsifying a hydrocarbon based sludge according to claim 114 wherein said DDBSA amine salt comprises at least about 0.3 percent the volume of said sludge.

116. A method of demulsifying hydrocarbon based sludge according to claim 115 wherein said demulsifier is provided in a volume of at least about 1.5 percent the volume of said sludge.

117. A method of liquefying and demulsifying a hydrocarbon based sludge according to claim 63 wherein said demulsifier is comprised of polyalkylene glycols.

118. A method of liquefying and demulsifying a hydrocarbon based sludge according to claim 117 wherein said polyalkylene glycols comprise at least about 0.075 percent the volume of said sludge.

119. A method of demulsifying hydrocarbon based sludge according to claim 118 wherein said demulsifier is provided in a volume of at least about 1.5 percent the volume of said sludge.

120. A method of liquefying and demulsifying a hydrocarbon based sludge according to claim 117 wherein said polyalkylene glycols have an average molecular weight of between about 950 and about 1,200.

121. A method of liquefying and demulsifying a hydrocarbon based sludge according to claim 120 wherein said polyalkylene glycols comprise at least about 0.075 percent the volume of said sludge.

122. A method of demulsifying hydrocarbon based sludge according to claim 121 wherein said demulsifier is provided in a volume of at least about 1.5 percent the volume of said sludge.

123. A method of liquefying and demulsifying a hydrocarbon based sludge according to claim 63 wherein said demulsifier is comprised of polypropylene glycols.

124. A method of liquefying and demulsifying a hydrocarbon based sludge according to claim 123 wherein said polypropylene glycols comprise at least about 0.075 percent the volume of said sludge.

125. A method of demulsifying hydrocarbon based sludge according to claim 124 wherein said demulsifier is provided in a volume of at least about 1.5 percent the volume of said sludge.

126. A method of liquefying and demulsifying a hydrocarbon based sludge according to claim 123 wherein said polypropylene glycols have an average molecular weight of between about 950 and about 1,200.

127. A method of liquefying and demulsifying a hydrocarbon based sludge according to claim 126 wherein said polypropylene glycols comprise at least about 0.075 percent the volume of said sludge.

128. A method of demulsifying hydrocarbon based sludge according to claim 127 wherein said demulsifier is provided in a volume of at least about 1.5 percent the volume of said sludge.

129. A method of liquefying and demulsifying a hydrocarbon based sludge according to claim 63 wherein said demulsifier is comprised of a terpene.

130. A method of liquefying and demulsifying a hydrocarbon based sludge according to claim 129 wherein said terpene comprises at least about 0.0625 percent the volume of said sludge.

131. A method of demulsifying hydrocarbon based sludge according to claim 130 wherein said demulsifier is provided in a volume of at least about 1.5 percent the volume of said sludge.

132. A method of liquefying and demulsifying a hydrocarbon based sludge according to claim 63 wherein said demulsifier is comprised of citrene.

133. A method of liquefying and demulsifying a hydrocarbon based sludge according to claim 132 wherein said citrene comprises at least about 0.0625 percent the volume of said sludge.

134. A method of demulsifying hydrocarbon based sludge according to claim 133 wherein said demulsifier is provided in a volume of at least about 1.5 percent the volume of said sludge.

135. A method of demulsifying hydrocarbon based sludge according to claim 63 wherein said demulsifier is provided in a volume of at least about 1.5 percent the volume of said sludge.

136. A method of liquefying and demulsifying a hydrocarbon based sludge comprising:
   treating said sludge with a liquefaction agent comprising glycol ethers, wherein said liquefaction agent is provided in a volume of at least about 0.5 percent the volume of said sludge;
   treating said sludge with a demulsifier comprising dodecyl benzyl sulfonic acid (DDBSA), wherein said demulsifier is provided in a volume of at least about 0.5 percent the volume of said sludge;
   circulating said sludge; and
   allowing said sludge to separate into a solid, a water, and an oil component.

137. A method of liquefying and demulsifying a hydrocarbon based sludge according to claim 136 wherein said glycol ethers comprise at least about 0.025 percent the volume of said sludge.

138. A method of liquefying and demulsifying a hydrocarbon based sludge according to claim 137 wherein said liquefaction agent is provided in a volume of at least about 5.0 percent the volume of said sludge.

139. A method of liquefying and demulsifying a hydrocarbon based sludge according to claim 137 wherein said liquefaction agent is provided in a volume of at least about 10.0 percent the volume of said sludge.

140. A method of liquefying and demulsifying a hydrocarbon based sludge according to claim 136 wherein said glycol ethers comprise at least about 0.25 percent the volume of said sludge.

141. A method of liquefying and demulsifying a hydrocarbon based sludge according to claim 140 wherein said liquefaction agent is provided in a volume of at least about 5.0 percent the volume of said sludge.

142. A method of liquefying and demulsifying a hydrocarbon based sludge according to claim 140 wherein said liquefaction agent is provided in a volume of at least about 10.0 percent the volume of said sludge.

143. A method of liquefying and demulsifying a hydrocarbon based sludge according to claim 136 wherein said glycol ethers comprise ethylene glycol butyl ether.

144. A method of liquefying and demulsifying a hydrocarbon based sludge according to claim 143 wherein said ethylene glycol butyl ether comprises at least about 0.025 percent the volume of said sludge.

145. A method of liquefying and demulsifying a hydrocarbon based sludge according to claim 144 wherein said liquefaction agent is provided in a volume of at least about 5.0 percent the volume of said sludge.

146. A method of liquefying and demulsifying a hydrocarbon based sludge according to claim 144 wherein said liquefaction agent is provided in a volume of at least about 10.0 percent the volume of said sludge.

147. A method of liquefying and demulsifying a hydrocarbon based sludge according to claim 143 wherein said ethylene glycol butyl ether comprises at least about 0.25 percent the volume of said sludge.

148. A method of liquefying and demulsifying a hydrocarbon based sludge according to claim 147 wherein said liquefaction agent is provided in a volume of at least about 5.0 percent the volume of said sludge.

149. A method of liquefying and demulsifying a hydrocarbon based sludge according to claim 147 wherein said liquefaction agent is provided in a volume of at least about 10.0 percent the volume of said sludge.

150. A method of liquefying and demulsifying a hydrocarbon based sludge according to claim 136 wherein said glycol ethers comprise polymerized glycol ethers.

151. A method of liquefying and demulsifying a hydrocarbon based sludge according to claim 150 wherein said polymerized glycol ethers comprise at least about 0.025 percent by volume of said liquefaction agent.

152. A method of liquefying and demulsifying a hydrocarbon based sludge according to claim 151 wherein said liquefaction agent is provided in a volume of at least about 5.0 percent the volume of said sludge.

153. A method of liquefying and demulsifying a hydrocarbon based sludge according to claim 151 wherein said liquefaction agent is provided in a volume of at least about 10.0 percent the volume of said sludge.

154. A method of liquefying and demulsifying a hydrocarbon based sludge according to claim 150 wherein said polymerized glycol ethers comprise at least about 0.25 percent the volume of said sludge.

155. A method of liquefying and demulsifying a hydrocarbon based sludge according to claim 154 wherein said liquefaction agent is provided in a volume of at least about 5.0 percent the volume of said sludge.

156. A method of liquefying and demulsifying a hydrocarbon based sludge according to claim 154 wherein said liquefaction agent is provided in a volume of at least about 10.0 percent the volume of said sludge.

157. A method of liquefying and demulsifying a hydrocarbon based sludge according to claim 136 wherein said glycol ethers comprise poly (oxy-1, 2 ethanediyl) α butyl Ω hydroxy.

158. A method of liquefying and demulsifying a hydrocarbon based sludge according to claim 157 wherein said poly (oxy-1, 2 ethanediyl) α butyl Ω hydroxy comprises at least about 0.025 percent the volume of said sludge.

159. A method of liquefying and demulsifying a hydrocarbon based sludge according to claim 158 wherein said liquefaction agent is provided in a volume of at least about 5.0 percent the volume of said sludge.

160. A method of liquefying and demulsifying a hydrocarbon based sludge according to claim 158 wherein said liquefaction agent is provided in a volume of at least about 10.0 percent the volume of said sludge.

161. A method of liquefying and demulsifying a hydrocarbon based sludge according to claim 157 wherein said poly (oxy-1, 2 ethanediyl) α butyl Ω hydroxy comprises at least about 0.25 percent the volume of said sludge.

162. A method of liquefying and demulsifying a hydrocarbon based sludge according to claim 161 wherein said liquefaction agent is provided in a volume of at least about 5.0 percent the volume of said sludge.

163. A method of liquefying and demulsifying a hydrocarbon based sludge according to claim 161 wherein said liquefaction agent is provided in a volume of at least about 10.0 percent the volume of said sludge.

164. A method of liquefying and demulsifying a hydrocarbon based sludge according to claim 136 wherein said liquefaction agent is comprised of sodium silicate.

165. A method of liquefying and demulsifying a hydrocarbon based sludge according to claim 164 wherein said sodium silicate comprises at least about 0.025 percent the volume of said sludge.

166. A method of liquefying and demulsifying a hydrocarbon based sludge according to claim 165 wherein said liquefaction agent is provided in a volume of at least about 5.0 percent the volume of said sludge.

167. A method of liquefying and demulsifying a hydrocarbon based sludge according to claim 165 wherein said liquefaction agent is provided in a volume of at least about 10.0 percent the volume of said sludge.

168. A method of liquefying and demulsifying a hydrocarbon based sludge according to claim 136 wherein said liquefaction agent is comprised of a terpene.

169. A method of liquefying and demulsifying a hydrocarbon based sludge according to claim 168 wherein said terpene comprises at least about 0.25 percent the volume of said sludge.

170. A method of liquefying and demulsifying a hydrocarbon based sludge according to claim 169 wherein said liquefaction agent is provided in a volume of at least about 5.0 percent the volume of said sludge.

171. A method of liquefying and demulsifying a hydrocarbon based sludge according to claim 169 wherein said liquefaction agent is provided in a volume of at least about 10.0 percent the volume of said sludge.

172. A method of liquefying and demulsifying a hydrocarbon based sludge according to claim 136 wherein said liquefaction is comprised of citrene.

173. A method of liquefying and demulsifying a hydrocarbon based sludge according to claim 172 wherein said citrene comprises at least about 0.25 percent the volume of said sludge.

174. A method of liquefying and demulsifying a hydrocarbon based sludge according to claim 173 wherein said liquefaction agent is provided in a volume of at least about 5.0 percent the volume of said sludge.

175. A method of liquefying and demulsifying a hydrocarbon based sludge according to claim 173 wherein said liquefaction agent is provided in a volume of at least about 10.0 percent the volume of said sludge.

176. A method of liquefying and demulsifying a hydrocarbon based sludge according to claim 136 wherein said liquefaction agent is comprised of an acid of sufficient strength to reduce the pH of said liquefaction agent to between about 5 and about 6.

177. A method of liquefying and demulsifying a hydrocarbon based sludge according to claim 176 wherein said acid is comprised of citric acid.

178. A method of liquefying and demulsifying a hydrocarbon based sludge according to claim 177 wherein said liquefaction agent is provided in a volume of at least about 5.0 percent the volume of said sludge.

179. A method of liquefying and demulsifying a hydrocarbon based sludge according to claim 177 wherein said liquefaction agent is provided in a volume of at least about 10.0 percent the volume of said sludge.

180. A method of liquefying and demulsifying a hydrocarbon based sludge according to claim 136 wherein said liquefaction agent is provided in a volume of at least about 5.0 percent the volume of said sludge.

181. A method of liquefying and demulsifying a hydrocarbon based sludge according to claim 136 wherein said liquefaction agent is provided in a volume of at least about 10.0 percent the volume of said sludge.

182. A method of liquefying and demulsifying a hydrocarbon based sludge according to claim 136 wherein said DDBSA comprises at least about 0.3 percent the volume of said sludge.

183. A method of demulsifying hydrocarbon based sludge according to claim 182 wherein said demulsifier is provided in a volume of at least about 1.5 percent the volume of said sludge.

184. A method of liquefying and demulsifying a hydrocarbon based sludge according to claim 136 wherein said DDBSA is provided in the form of a salt of DDBSA.

185. A method of liquefying and demulsifying a hydrocarbon based sludge according to claim 184 wherein said DDBSA salt comprises at least about 0.3 percent the volume of said sludge.

186. A method of demulsifying hydrocarbon based sludge according to claim 185 wherein said demulsifier is provided in a volume of at least about 1.5 percent the volume of said sludge.

187. A method of liquefying and demulsifying a hydrocarbon based sludge according to claim 136 wherein said demulsifier is comprised of an amine salt of DDBSA.

188. A method of liquefying and demulsifying a hydrocarbon based sludge according to claim 187 wherein said DDBSA amine salt comprises at least about 0.3 percent the volume of said sludge.

189. A method of demulsifying hydrocarbon based sludge according to claim 188 wherein said demulsifier is provided in a volume of at least about 1.5 percent the volume of said sludge.

190. A method of liquefying and demulsifying a hydrocarbon based sludge according to claim 136 wherein said demulsifier is comprised of polyalkylene glycols.

191. A method of liquefying and demulsifying a hydrocarbon based sludge according to claim 190 wherein said polyalkylene glycols comprise at least about 0.075 percent the volume of said sludge.

192. A method of demulsifying hydrocarbon based sludge according to claim 191 wherein said demulsifier is provided in a volume of at least about 1.5 percent the volume of said sludge.

193. A method of liquefying and demulsifying a hydrocarbon based sludge according to claim 190 wherein said polyalkylene glycols have an average molecular weight of between about 950 and about 1,200.

194. A method of liquefying and demulsifying a hydrocarbon based sludge according to claim 193 wherein said polyalkylene glycols comprise at least about 0.075 percent the volume of said sludge.

195. A method of demulsifying hydrocarbon based sludge according to claim 194 wherein said demulsifier is provided in a volume of at least about 1.5 percent the volume of said sludge.

196. A method of liquefying and demulsifying a hydrocarbon based sludge according to claim 136 wherein said demulsifier is comprised of polypropylene glycols.

197. A method of liquefying and demulsifying a hydrocarbon based sludge according to claim 196 wherein said polypropylene glycols comprise at least about 0.075 percent the volume of said sludge.

198. A method of demulsifying hydrocarbon based sludge according to claim 197 wherein said demulsifier is provided in a volume of at least about 1.5 percent the volume of said sludge.

199. A method of liquefying and demulsifying a hydrocarbon based sludge according to claim 196 wherein said polypropylene glycols have an average molecular weight of between about 950 and about 1,200.

200. A method of liquefying and demulsifying a hydrocarbon based sludge according to claim 199 wherein said polypropylene glycols comprise at least about 0.075 percent the volume of said sludge.

201. A method of demulsifying hydrocarbon based sludge according to claim 200 wherein said demulsifier is provided in a volume of at least about 1.5 percent the volume of said sludge.

202. A method of liquefying and demulsifying a hydrocarbon based sludge according to claim 136 wherein said demulsifier is comprised of a terpene.

203. A method of liquefying and demulsifying a hydrocarbon based sludge according to claim 202 wherein said terpene comprises at least about 0.0625 percent the volume of said sludge.

204. A method of demulsifying hydrocarbon based sludge according to claim 203 wherein said demulsifier is provided in a volume of at least about 1.5 percent the volume of said sludge.

205. A method of liquefying and demulsifying a hydrocarbon based sludge according to claim 136 wherein said demulsifier is comprised of citrene.

206. A method of liquefying and demulsifying a hydrocarbon based sludge according to claim 205 wherein said citrene comprises at least about 0.0625 percent the volume of said sludge.

207. A method of demulsifying hydrocarbon based sludge according to claim 206 wherein said demulsifier is provided in a volume of at least about 1.5 percent the volume of said sludge.

208. A method of demulsifying hydrocarbon based sludge according to claim 136 wherein said demulsifier is provided in a volume of at least about 1.5 percent the volume of said sludge.

* * * * *